United States Patent [19]
Fujita

[11] 4,338,958
[45] Jul. 13, 1982

[54] SPRAY BOOTH ASSEMBLY FOR WASHING OR CHEMICALLY TREATING OBJECTS OF DESIRED KIND

[76] Inventor: Junji Fujita, 781-1, Tateishi-machi, Tosu-shi, Saga-ken, Japan

[21] Appl. No.: 228,521

[22] Filed: Jan. 26, 1981

[30] Foreign Application Priority Data

| Jul. 10, 1980 [JP] | Japan | 55-97640[U] |
| Oct. 8, 1980 [JP] | Japan | 55-144588[U] |
| Oct. 8, 1980 [JP] | Japan | 55-144589[U] |
| Oct. 8, 1980 [JP] | Japan | 55-144590[U] |

[51] Int. Cl.³ ............................................. B08B 3/02
[52] U.S. Cl. ................................. 134/104; 134/154; 134/165; 134/199; 118/DIG. 7; 118/326; 98/115 SB
[58] Field of Search ................................. 134/82-83, 134/104, 114, 131, 151, 154, 165, 182-183, 199-200; 118/DIG. 7, 326, 634; 98/115 SB

[56] References Cited

U.S. PATENT DOCUMENTS

| 2,207,452 | 7/1940 | Bingman | 134/165 X |
| 2,579,575 | 12/1951 | Herdlein | 134/131 X |
| 2,596,653 | 5/1952 | Clague et al. | 134/199 |
| 3,270,711 | 9/1966 | Leach | 118/326 X |
| 4,207,833 | 6/1980 | Napadow | 118/DIG. 7 X |
| 4,231,806 | 11/1980 | Henry | 134/154 X |

FOREIGN PATENT DOCUMENTS

| 2212765 | 6/1974 | France | 118/634 |

*Primary Examiner*—Robert L. Bleutge
*Attorney, Agent, or Firm*—Jordan and Hamburg

[57] ABSTRACT

The spray booth assembly of this invention is used for washing or chemically treating various kinds of objects in various industrial fields. The assembly is substantially characterized by providing a vacuum zone at or below a hanger path which allows the hangers suspended by the conveyor means to travel in a longitudinal direction in the open-type spray booth while carrying the objects to be sprayed. Whereby, the spray booth assembly can prevent the water or chemical moisture from flowing out through the hanger path toward the hanger conveying means.

5 Claims, 6 Drawing Figures

SPRAY BOOTH ASSEMBLY FOR WASHING OR CHEMICALLY TREATING OBJECTS OF DESIRED KIND

BACKGROUND OF THE DISCLOSURE

This invention relates to a spray booth assembly used in various fields of industry including automobile industry for the purpose of washing, coating or chemically treating the object of desired kind, such as automobiles. There have been devised various types of assemblies heretofore for that purpose and one of such conventional spray booth assembly is shown in FIG. 1. The assembly substantially comprises closed type tunnel-like spray booth (1) (the exit and the entry are open) with a chain conveyor (2) installed in a ceiling (3) thereof a plurality of hangers (4) suspending from the conveyor (2) at required intervals and holding objects (5) to be sprayed, and a U-shaped jet pipe (6) which is branched off from a fluid supply pipe (7) at the bottom thereof and is used to spray water or chemical liquid against the objects (6). Such conventional spray booth assembly is also provided with partitions (8) for separating a ceiling room (B) from a jet spraying room (A). However, the moisture of water or chemical fluid which is produced during the spraying operation spreads or infiltrates into the ceiling room (B) from the jet spraying room (A) through a hanger path (9) formed between partitions (8) and adheres to the chain conveyor (2). Furthermore, the moisture is not removed from the ceiling room (B) because of closed ceiling structure. This causes the mechanism of the conveyor (2) to be deteriorated by rust, errosion and corrosion and shortens the life of the conveyor (2) drastically. Still furthermore, the lubricant used in the conveyor mechanism runs with water along the vertical hanger (4) and stains the objects to be washed or chemically treated, which results in poor coating.

Besides the above provision of partitions (8), conventionally repeated attempts have been made without any noticeable results to isolate the jet spraying room (A) from the ceiling space (B).

Accordingly, it is an object of the present invention to provide a spray (shower) booth assembly which can overcome such shortcomings and problems afflicting conventional assemblies.

It is another object of the present invention to provide an open type spray (shower) booth assembly which can completely prevent the moisture of water and chemical liquid from infiltrating into the ceiling room and ill-effecting the mechanism of the conveyor, and also can prevent the lubricant from dripping on the objects to be washed or chemically treated.

In summary, the spray booth assembly of this invention comprises
(a) a spray booth having a tunnel-like construction, the spray booth provided with a longitudinal slit opening on a ceiling thereof, the longitudinal slit opening forming a hanger path, (b) a hanger conveying means disposed above the ceiling of the spray booth in alignment with the hanger path, (c) a plurality of vertical hangers movably suspended through the hanger path down into the spray booth from the hanger conveying means at desired intervals, the each hanger having a lower extremity thereof provided with an object to be sprayed, (d) spray means disposed within the spray booth for spraying water or other chemical solvent onto the object to be sprayed, and (e) means for producing a vacuum zone at or below the hanger path, whereby the spray booth assembly of this invention can prevent the water or chemical moisture from flowing out through the hanger path toward the hanger conveying means.

DETAILED DESCRIPTION OF DISCLOSURE

The spray (shower) booth assembly according to this invention is described in great details in conjunction with an embodiment shown in FIG. 2 to FIG. 6.

Figure 1:
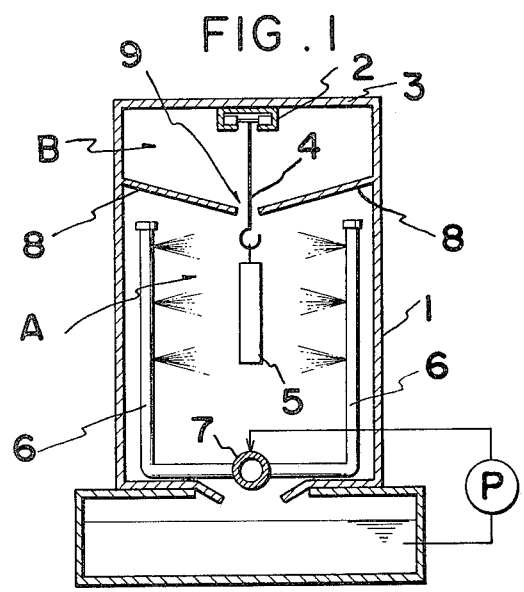
FIG. 1 is a transverse cross sectional view of a conventional-type spray (shower) booth assembly.
Figure 2:
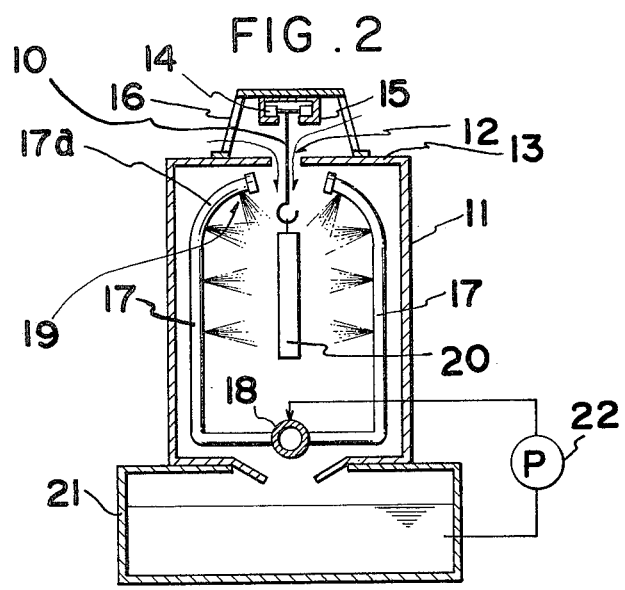
FIG. 2 is a transverse cross sectional view of a spray booth assembly according to this invention.

As shown in FIG. 2, a spray (shower) booth (11) is of an open type with a hanger path (12) in a ceiling part (3) thereof. A chain conveyor (14) is installed above the hanger path (12). In more details, the chain conveyor (14) is movably mounted on a guide rail (15) which, in turn, is supported by legs (16) on the ceiling (13) of the booth (11). A plurality of hangers (10) are suspended by the conveyor (14) at regular intervals in a longitudinal direction. Each hanger (10) extends into the spray booth (11) through the hanger path (12). A U-shaped jet pipe (17) is stationarily disposed in the spray booth (11) and is branched off from a fluid supply pipe (18) which supplies water or chemical liquid to the jet pipe (17). The jet pipe (17) has two vertical upper portions (17a) curved toward the inside. Spray nozzles (19) are also attached to such upper curved portions of the jet pipe (17), thus making the spray opening thereof directed in a slantly downward direction.

Referring now to the other elements of the shower booth assembly of the present invention, numeral (20) indicates an object to be washed, numeral (21) indicates the reservoir tank, and numeral (22) indicates a pump circulating the returned water or solution under pressure to the supply pipe (18) from reservoir tank (21).

The manner in which the spray booth assembly of this invention is operated in an actual coating line is described hereinafter.

The coating line usually comprises several shower booths having aforementioned structure. The number of booths depends on the formation of the process. The process, for example, consisting of washing in water→degreasing→washing in water→washing in hot water→washing in acid→washing in water→washing in pure water employs the shower booth in each step, being followed by coating and printing process of the same conveyor line.

The object (20) suspended by the hanger (10) is sprayed while being moved at a predetermined speed.

In the above spraying operation, since the upper portions (17a) of the jet pipe (17) is curved inwardly and the spray nozzles (19) have their spray openings directed in a slantly downward direction, such spraying will reduce the pressure of the hanger path (12) forming a vacuum zone at or below the hanger path (12). Due to such phenomenon, the atmospheric air is introduced into the spray booth (11) through the hanger path (12) from the outside of the spray booth (11) as shown in an arrow direction. That is, the moisture in the booth (11)

does not overflow through the hanger path (12), rather the condition occurrs in which the air is introduced into the inside of the booth (11).

The vacuum zone at or below the hanger path (12) can be produced by other provisions. Several such provisions are shown in FIG. 3 to FIG. 6.

Figure 3:
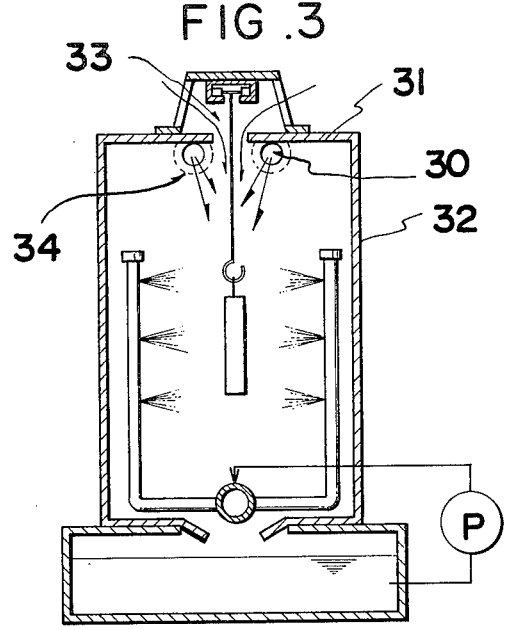
FIG. 3 to FIG. 6 are transverse cross sectional views of several modifications of the above assembly of the present invention.

In FIG. 3, the provision is constructed, such that, two elongated pipes (30) are mounted on the lower surface of ceiling (31) of a spray booth (32) along and adjacent to a hanger path (33) and each elongated pipe (30) is provided with spray apertures (34) on the lower surface thereof, whereby a pressurized fluid which passes through the elongated pipe (30) flows downward in an arrow direction into the spray booth (32) thus producing the vacuum zone at or below the hanger path (33).

Figure 4:
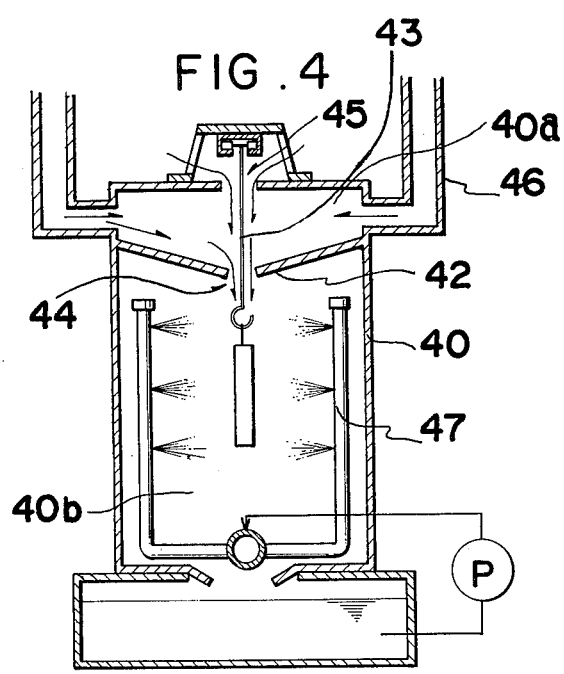
Figure 5:
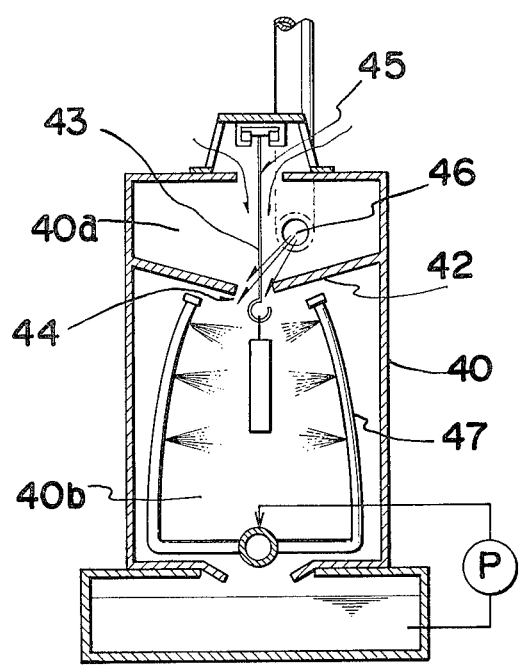

In FIG. 4 and FIG. 5, the provision is constructed, such that, an upper portion (40a) of a spray booth (40) is separated by a pair of longitudinal partition plates (42) which laterally extend toward suspended hangers (43) from vertical walls of the spray booth (40) while forming a second hanger path (44) therebetween besides a first hanger path (45) and two ducts (46) are communicably attached to the upper portion (40a) of the spray booth (40) so as to spray pressurized fluid from the duct (46) into a lower main chamber (40b) of the booth (40) through the second hanger path (44), whereby a vacuum zone is produced at or below the first hanger path (45) due to the supply of the pressurized fluid.

Of course, as shown in FIG. 5, the above provision can be coupled with the provision of FIG. 2 by inclining a U-shaped jet pipe (47) toward the inside to enhance the degree of vacuum in the vacuum zone.

Figure 6:
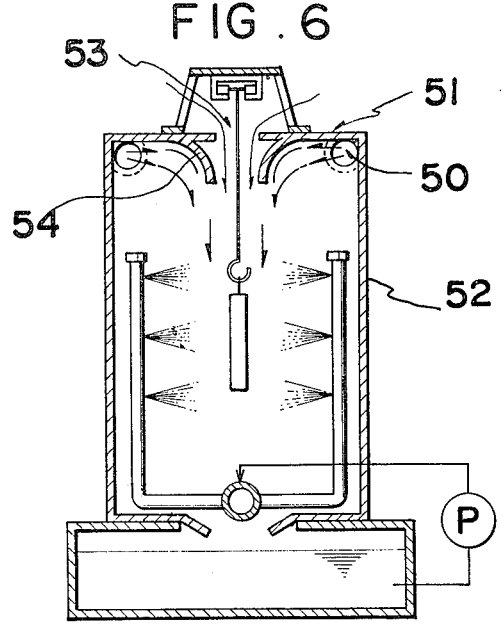

In FIG. 6, the provision is constructed, such that, two elongated pipes (50) are mounted on the lower surface of a ceiling (51) of a spray booth (52) along and parallely spaced-apart from a hanger path (53), two fluid guides (54) are also mounted on the lower surface of the ceiling (51) of the spray booth (52) along and adjacent to the hanger path (53), and the fluid guides (54) are positioned and shaped so as to direct a flow of a pressurized fluid from the pipes (50) in a downward direction.

As has been described heretofore, the spray booth assembly provides the advantages that because the moisture in the booth does not spread beyond the hanger path and the conveyor is not in the closed part, the conveyor is protected from rust and deterioration, the life of the conveyor may be remarkably extended, poor coating due to dripping of lubricant and water is prevented, and the structure is simplified, and that inspection and maintenance are easily performed because of lighting available through the open hanger path.

Especially, in the coating line in which heating and cooling are repeated, this device largely contributes to the life extension of the conveyor.

What we claim:

1. A spray booth assembly for washing or chemically treating objects of desired kind comprising
   (a) a spray booth having an open-type tunnel-like construction, said spray booth provided with a longitudinal slit opening on a ceiling thereof said longitudinal slit opening forming a hanger path,
   (b) a hanger conveying means disposed above said ceiling of said spray booth in alignment with said hanger path,
   (c) a plurality of vertical hangers movably suspended through said hanger path down into said spray booth from said hanger conveying means at desired intervals, said each hanger a lower extremity thereof provided with an object to be sprayed,
   (d) spray means disposed within said spray booth for spraying water or other chemical solvent onto said object to be sprayed, and
   (e) means for producing a vacuum zone at or below said hanger path, whereby said spray booth assembly can prevent the water or chemical moisture from flowing out through said hanger path toward said hanger conveying means.

2. A spray booth assembly according to claim 1, wherein said vacuum zone producing means is constructed such that, a plurality of U-shaped spray pipes are disposed longitudinally within said spray booth at desired intervals for providing said spray means and said each spray pipe has two parallely-disposed vertical portions curved toward the inside as said vertical portions approaches to said ceiling of said spray booth and spray nozzles are attached to said curved portions of said spray pipes making the spraying direction thereof directed in a slantly downward direction.

3. A spray booth assembly according to claim 1, wherein said vacuum zone producing means is constructed, such that, at least one elongated pipe is mounted on the lower surface of said ceiling of said spray booth along and adjacent to said hanger path and said elongated pipe is provided with spray apertures on the lower surface thereof, whereby a pressurized fluid which passes through said elongated pipe flows downward in said spray booth thus producing said vacuum zone at or below said hanger path.

4. A spray booth assembly according to claim 1, wherein said vacuum zone producing means is constructed, such that, an upper portion of said spray, booth is separated by a pair of longitudinal partition plates which laterally extend toward said suspended hangers from vertical walls of said booth while forming a second hanger path therebetween and at least a duct means is communicably attached to said upper portion of said spray chamber so as to spray pressurized fluid from said duct into a lower main chamber of said booth through said second hanger path, whereby a vacuum zone is produced at or below said hanger path due to said supply of said pressurized fluid.

5. A spray booth assembly according to claim 1, wherein said vacuum producing means is constructed, such that, at least one elongated pipe is mounted on the lower surface of said ceiling of said spray booth along and parallely spaced-apart from said hanger path, at least one fluid guide means is mounted on said lower surface of said ceiling of said spray booth along and adjacent to said hanger path, and said fluid guide is positioned and shaped so as to direct a flow of a presurized fluid from said pipe in a downward direction.

* * * * *